A. BRANDWEINER.
MEANS FOR COMPOSING PHOTOGRAPHIC PRINTING DESIGNS FROM VARIOUS ORIGINAL PICTURES OR PATTERNS BY MEANS OF DIVISION LINES.
APPLICATION FILED NOV. 27, 1908.
990,832.
Patented May 2, 1911.
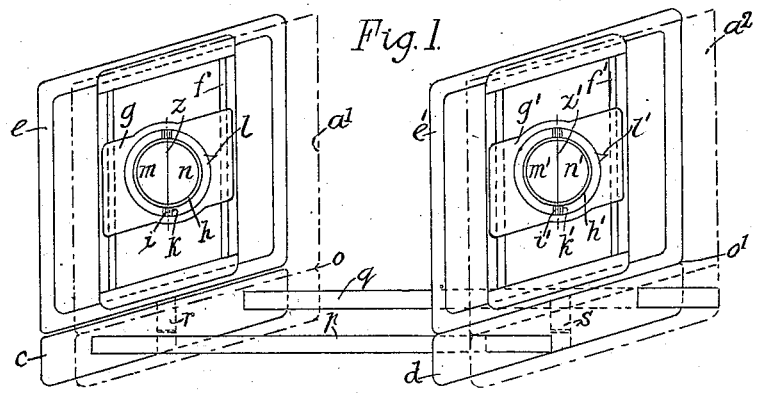
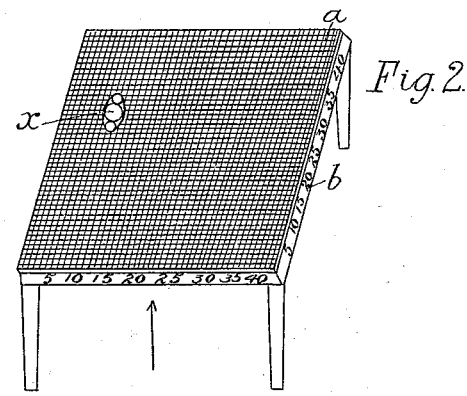
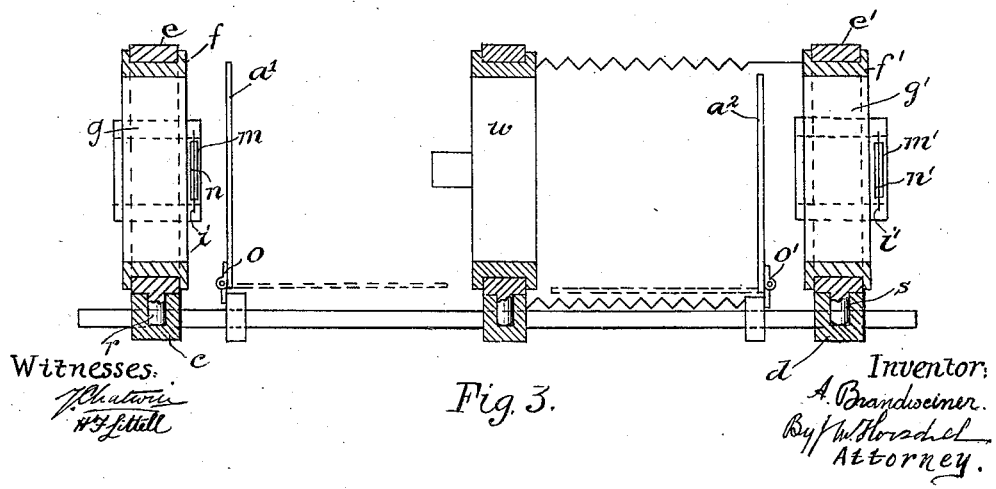

UNITED STATES PATENT OFFICE.

ADOLF BRANDWEINER, OF STUTTGART, GERMANY.

MEANS FOR COMPOSING PHOTOGRAPHIC PRINTING-DESIGNS FROM VARIOUS ORIGINAL PICTURES OR PATTERNS BY MEANS OF DIVISION-LINES.

990,832.   Specification of Letters Patent.   Patented May 2, 1911.

Application filed November 27, 1908. Serial No. 464,669.

*To all whom it may concern:*

Be it known that I, ADOLF BRANDWEINER, a subject of the German Emperor, residing at Stuttgart, Bavaria, in the Empire of Germany, have invented a new and useful method and means for composing photographic printing-designs from various original pictures or patterns by means of division-lines, of which the following is a specification.

My invention relates to a method of and means for composing photographic negatives of composite pictures or designs by means of a plurality of ruled screens in conjunction with pivoted carriers connected with a photographic camera.

Heretofore photographic designs have been obtained by gradually shifting transparent copies of the separate components of the design by means of a precision device and then reproducing these in successive portions on a stationary sensitized plate by repeated exposures and readjustments. For very complicated designs it has been necessary to prepare in this manner intermediate photographic pictures which subsequently had to be re-arranged part by part and then finally again photographed so as to provide a complete original for the engraver of checks and bank-notes. These repeated photographings render the lines indistinct and even unfit for use in high class work or prints.

The object of my invention is to provide a method and apparatus which enables the most complicated pictures or designs to be composed from original transparent pictures in a precise and sharply defined manner and directly photographed on a sensitized plate. For this purpose I provide a ruled frame suitably numbered, upon which the pictures or designs are shaped together, cut and composed by hand from divers separate photographic or other transparent pictures. These prepared transparent pattern-pictures are then trimmed and removed and carefully placed in the same order upon a movable carrier connected with the front of a photographic camera and fitted with a transparent screen ruled in the same manner as the aforementioned composing frame so that the individual parts of the picture may be readily disposed in an accurate upright position and in the exact order as previously composed. These ruled screens are only used for composing and for adjusting the parts of pictures in the photographic apparatus. I also provide means for adjusting the transparent pattern pictures at an angle in front of the photographic lens so as to enable distorted or shadow pictures to be produced. The aforesaid means consist essentially of two compound pivoted carriers connected with the photographic apparatus so as to receive the original picture and turn and move or adjust the same in any desired direction, each carrier being provided or supplemented with a hinged ruled screen for the purpose previously mentioned. I am aware that it has been previously proposed to fit a photographic apparatus of a similar kind with a rotary and endwise moving carrier as well as with a perforated or ruled screen or stencil.

The accompanying drawings show my improved apparatus.

Figure 1 is a diagrammatical perspective view of the combined photographic apparatus with two adjustable pivoted compound carriers and two hinged ruled screens. Fig. 2 is a perspective view of the composing frame. Fig. 3 is a longitudinal section of the apparatus showing more fully the camera and arrangements of parts.

For my purpose I require three similarly ruled screens $a$, $a^1$ and $a^2$. The screen $a$ serves for composing by hand, from separate original parts transparent pattern pictures for direct and complete reproduction on sensitized surfaces, or for taking a photographic picture. The screen $a^1$ is placed in front of the lens of the photographic apparatus, while the screen $a^2$ is placed within the apparatus near the film or sensitized plate-carrier. These screens consist advantageously of transparent plates ruled with cross-lines. The plate $a$ is mounted upon a frame or stand $b$ on four feet so as to serve in composing pictures by hand. The screens or plates $a^1$, $a^2$ are correspondingly ruled and numbered, and they are hinged at $o$, $o^1$ so as to turn down when desired.

The photographic apparatus comprises two rails $p$ and $q$ on which are mounted the slidable base block $c$ for the pattern picture carrier and slidable base block $d$ for the sensitized plate carrier.

The pattern picture-carrier consists of a disk $m$ $n$ mounted so as to turn in a ring $h$ on an axis $z$ by virtue of pivots $i$ retained in bearings $k$. The ring $h$ is capable of turning in a sliding holder $g$ which can move up and down in a frame $f$, the latter being slidable toward the right and left in a frame $e$. The sensitized plate-carrier within and forming the rear portion of the camera is constructed in like manner, of a disk $m^1$ $n^1$ which turns in a ring $h^1$ on an axis $z^1$ by means of pivots $i^1$ retained in bearings $k$, said ring turning in a sliding holder $g^1$ vertically movable in a frame $f^1$ which latter slides laterally in a frame $e^1$. The pattern picture-carrier is mounted in its base-block $c$ by means of a pivot $r$, while the sensitized-plate carrier is mounted in its base block $d$ by means of pivot $s$. A handle and pointer $l$ or $l^1$ serves to adjust the carrier ring $h$ or $h^1$ in its holder $g$ or $g^1$.

The operation is as follows:—For composing a complete transparent pattern-picture, the separate original photographic productions, whether negative or positive of any desired objects, are placed upon the ruled screen $a$ (Fig. 2) and adjusted by hand side by side or partly one over another as may be necessary. All overlapping edges are then cut off so that the remaining portions accurately adjoin each other and form the required pattern picture. This transparent pattern-picture is then placed on the disk $m$, $n$ of the picture carrier and carefully adjusted in position by looking through the transparent screen $a^1$, which should be placed as near as possible to the picture carrier, and turning and displacing the latter up, down or sidewise until the adjustment is perfect. The adjustment can be readily carried out in a dark room with a light placed close to the back of the transparent pattern-picture. After the completion of this adjustment, the screen $a^1$ is turned down on its hinge $o$. A pattern picture thus produced may form a complete picture in itself, or it may serve as a repeat portion for the final picture to be completed in the photographic camera. Next the camera $w$ is adjusted for the desired size of the photographic picture. Then the screen $a^2$ within the camera is erected closely in front of the sensitized plate-carrier which latter at this period is furnished with a focusing plate. Any final adjustment can now be effected by alternately displacing the pattern-picture carrier $m$ $n$ and the plate carrier $m^1$ $n^1$. If the pattern picture serves as a repeat for the final photographic picture, the carrier $m^1$ $n^1$ is repeatedly moved into the various positions for the correct adjoining of the repeat, the various positions being carefully marked. The screen $a^2$ is now turned down and the sensitized plate is inserted in place of the focusing plate whereupon an exposure can be effected for obtaining a negative in the usual manner. If the pattern picture forms only a repeat-portion of any complete composite picture, a re-adjustment of either or both of the carriers follows an exposure until the final and complete photographic negative is obtained.

I claim—

1. The method of obtaining photographic negatives of composite pictures or designs by means of a plurality of similarly ruled screens in conjunction with pivoted carriers connected with a photographic camera which consists in first composing by hand upon a separate ruled screen a transparent pattern picture from various separate components, then recomposing said pattern picture on a carrier by the aid of a similar hinged ruled screen disposed adjacent to the carrier and in front of a photographic camera and finally adjusting the position of the design of the pattern picture on the sensitized plate by means of a third ruled screen disposed within the photographic camera in front of the focusing plate, substantially as hereinbefore described.

2. An apparatus for obtaining composite pictures, comprising a photographic camera having a ruled screen and an adjustable sensitized plate carrier within and an identically ruled screen and pattern-picture carrier without, all mounted slidably upon a pair of longitudinal rails, as hereinbefore described.

ADOLF BRANDWEINER.

Witnesses:
ADALBERT BAUER,
ERNEST ENTENMANN.

Copies of this patent may be obtained for five cents each, by addressing the "Commissioner of Patents, Washington, D. C."